Feb. 19, 1957 J. A. HERBST 2,782,347
FAIL-SAFE SERVO SYSTEM
Filed June 20, 1952

INVENTOR
John A. Herbst
BY
Philip G. Hilbert
ATTORNEY

United States Patent Office 2,782,347
Patented Feb. 19, 1957

2,782,347

FAIL-SAFE SERVO SYSTEM

John A. Herbst, Montville, N. J., assignor to Bogue Electric Manufacturing Co., Paterson, N. J., a corporation of New Jersey Application June 20, 1952, Serial No. 294,575

6 Claims. (Cl. 318—29)

This invention relates to servo systems. More particularly, the invention concerns systems including a reversible motor or other electrically operated device and control circuits therefor.

An object of this invention is to provide in a servo system using amplifiers as a part thereof, improved control circuits for determining the direction of the current in such system.

A further object of this invention is to provide in a servo system, saturable reactors forming parts of the power and control circuits, together with means for regulating the operation of the reactors so as to regulate the flow of current in the power circuits.

Conventional servo systems have a distinct disadvantage when a short or open circuit develops in the sensing circuit thereof, since the current values are then such as to cause the motor to operate to swing the output member and the interconnected variable resistor arm to either of its extreme positions. When such systems are used to operate control elements such as aeroplane wing flaps, a ship's rudder, or the like, at the instant of a short or open circuit in the sensing circuit, control is not only lost, but additionally, the controlled element will be moved to arbitrary positions at variance with the desired position thereof, so as to imperil the operation of the plane or ship, unless the servo system can be quickly replaced by manual control.

Accordingly, another object of this invention is to provide an improved servo system which includes means for automatically freezing the output member thereof in the position it had assumed at the instant of a short or open circuit in the sensing circuit of the system.

Yet another object of this invention is to provide an improved servo system including a reversible motor and a control circuit including means automatically operative to interrupt the power supply to the motor in response to current values in the control circuit other than a predetermined range of current values.

Other objects of this invention will in part be obvious and in part hereinafter pointed out.

Accordingly, the invention consists in the arrangement of parts and components and the circuit connections therefor which will be exemplified in the embodiments hereinafter described and of which the scope of invention will be indicated in the claims following.

Figure 1:
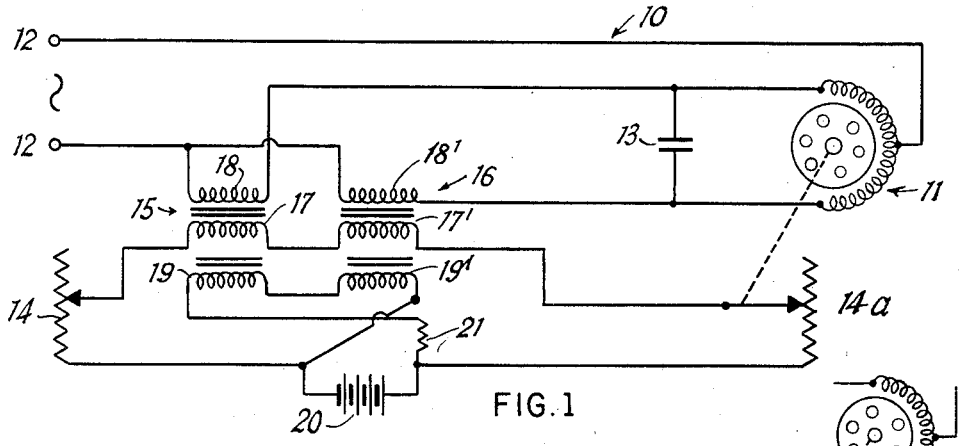
Fig. 1 is a circuit diagram of a servo system of the type to which my invention is applied.

Referring in detail to the drawing, and particularly to Fig. 1, 10 designates a servo system embodying the invention. The same comprises a reversible two phase alternating current motor 11 energized by a suitable source of current having terminals 12 and provided with a condenser 13 shunt connected across the windings thereof.

The system further comprises a sensing or control circuit made up of a pair of serially connected variable resistors such as rheostats 14, 14a; rheostat 14 being manually operable and rheostat 14a being operable by motor 11. A pair of saturable reactors 15, 16 have their control windings 17, 17' oppositely wound and interposed in the control circuit. The power windings 18, 18' of the reactors, are connected between one of the terminals 12 and the windings of the motor 11, as shown.

The reactors 15, 16 further include bias windings 19, 19' which are oppositely wound and connected with a source of direct current 20 and a fixed resistor 21. The resultant bias circuit is interposed in the control circuit, as shown in Fig. 1. The windings on reactors 15, 16 are arranged so that the fluxes created by the control windings 17, 17' are in opposed or bucking relation to the fluxes created by the bias windings 19, 19'. Fixed resistor 21 has a value equal to one half the sum of the values of the resistors 14, 14a.

When the arms of rheostats 14, 14a, are at their midpoints, the currents in the control and bias circuits will be balanced and the potential at the outer legs of the motor winding will be equal, thereby preventing operation of the motor. However, upon moving the arm of rheostat 14 on either side of the midpoint thereof, will create a condition of unbalance as between the control and bias circuits. For a resultant control current less than a predetermined value one of the reactors is operative to increase current values in the motor supply circuit so as to cause the motor to rotate in one direction. When such control current is greater than said predetermined value, the other reactor is operative to increase current values so as to allow the motor to rotate in the other direction.

It is apparent that upon moving the arm of rheostat 14 to any given position, the motor 11 will rotate to move the arm of rheostat 14a to such a position as will produce balanced conditions as between the control and bias circuits. An output member, not shown, which is suitably connected to the motor, will be moved to a corresponding position, in a manner known in the art.

In the system shown in Fig. 1, any short or open circuit which may occur in the control or sensing circuit will result in current values either greater than or less than the normal operating range of current values in said circuit. Accordingly, at the instant of the short or open circuit, the motor will be caused to operate to move the arm of rheostat 14a to one of its extreme positions, such positions possibly being radically different from the last controlled operating position.

Figure 2:
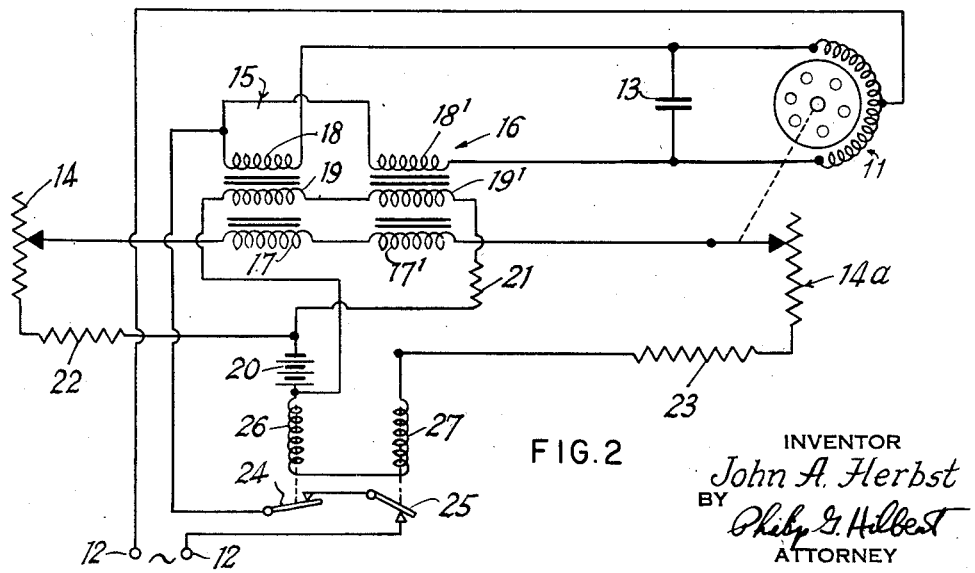
Fig. 2 is a circuit diagram of a system similar to that shown in Fig. 1 with fail-safe features included.

To overcome the disadvantages accruing from the incidence of short or open circuits, there is provided a system as shown in Fig. 2. Here, the motor 11, rheostats 14, 14a and reactors 15, 16 are interconnected in the manner previously described. Additionally, a pair of fixed resistors 22, 23 are inserted in the control or sensing circuit, as shown. The value of resistor 21 is made equal to one half the sum of the resistance values of rheostats 14, 14a plus the sum of the resistance values of resistors 22, 23.

Assuming that the resistance value of rheostats 14, 14a, is X ohms each and that the resistance value of resistors 22, 23 is 1.5X ohms each. In such case, resistor 21 should have a resistance value of 4X ohms. Furthermore, assuming that the current source 20 is of the order of 1 volt, then the current values in the control or sensing circuit may be calculated as follows.

With balanced conditions and the rheostat arms at their midpoints, the current in the circuit will equal the total voltage divided by the total resistance or .25X amperes. If the rheostat arms are in positions allowing maximum current to flow in the circuit, then such current will equal .33X amperes and with the rheostat arms in positions allowing minimum current to flow in the circuit, then such current will equal .20X amperes. Thus, the normal operating range of the control circuit will be between .20X amperes and .33X amperes.

Provision is made for opening the power circuit to the motor 11, in the event that current values other than the normal operating range of values should occur in the control or sensing circuit. To this end, there are provided a pair of relay operated, normally closed switches 24, 25 which are series connected and inserted in the power supply circuit, as shown in Fig. 2. Additionally, a pair of series connected relays 26, 27 are inserted in the control circuit, as between current source 20 and resistor 23. The relays 26, 27 operate switches 24, 25 respectively.

Relay 26 is operative to keep switch 24 closed for all current values in the range of normal operating currents, but upon a reduction of current in the control circuit below the minimum operating value, will permit switch 24 to open thus interrupting the current supply for the motor 11. Relay 27 is operative in response to current values in the control circuit which are greater than the maximum operating values, to open switch 25.

It will be apparent that if an open circuit should develop in the control circuit, then the resistance of the circuit will be infinite and no current will flow. Accordingly, relay 26 will allow switch 24 to open at the instant of the open circuit, thus preventing the motor 11 from moving the arm of rheostat 14a and the interconnected output member, not shown, from the last position at the time of the open circuit.

Assuming that a short circuit occurs at either end of the control circuit, then the current values in the circuit will be of the order of .66X amperes or .40X amperes, depending on which end of the circuit has the short. In either case, relay 27 will operate to open switch 25, thereby stopping the motor 11 at the instant of the short circuit and preventing further and uncontrolled movement of the rheostat arm and the output member, not shown.

The value of the resistors 22, 23 should be sufficiently large so that the current in the control circuit, in the event of a short circuit, will go beyond any normal value which may be encountered in normal operation. A minimum value of such resistors which will give a differential of about 10% between normal operating current and the current value with short circuit conditions, will insure optimum working of the system.

Figure 3:
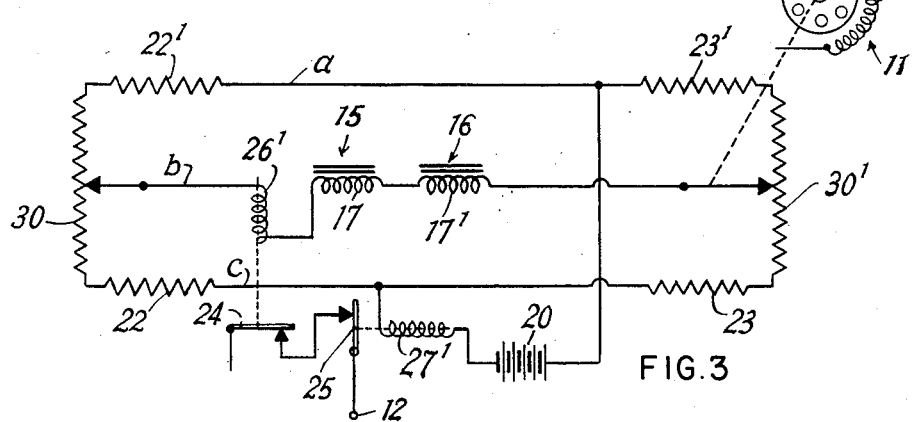
Fig. 3 is a circuit diagram somewhat similar to that shown in Fig. 2 and illustrating a second form of the invention.

In Fig. 3, is shown a system somewhat similar to that of Fig. 2, except that the rheostats are replaced by potentiometers 30, 30'. In addition to the pair of fixed resistors 22, 23, a second pair of fixed resistors 22', 23' are inserted in the control or sensing circuit, as shown in the figure. A relay 26' is connected between the arm of potentiometer 30 and winding 17 of reactor 15, such relay operating switch 24 while a relay 27' is connected in series with current source 20 and across the outer legs of the control circuit, such relay operating switch 25. It is understood that the interconnected switches 24, 25 are connected in circuit with the power circuit for the motor, as previously described. Furthermore, the power windings and bias windings of the reactors, not shown, are connected as shown in Fig. 2.

In the event of a short circuit between conductors $a$, $b$ or $b$, $c$, the current values will be such as to allow relay 26' to open switch 24. With a short circuit between conductors $a$, $c$, the current values will be such as to allow relay 27' to open switch 25. In the event of an open circuit in conductors $a$ or $c$, relay 26' will operate switch 24 to interrupt the operation of the motor. With an open circuit in conductor $b$, there will be no unbalanced signal and the system will be frozen at the position at the time of the open circuit.

It has been found that each of the fixed resistors 22, 23, 22' and 23' may have a resistance value of about twice the value of one of the potentiometers 30, 30', for optimum operation. In lieu of relay 27', a fuse may be used, the same being replaced upon blow out thereof.

The reactors 15, 16 may be provided with secondary bias windings for adjusting the operation of the reactors in accordance with selected portions of the transfer curve thereof.

It will thus be seen that there are provided servo systems in which the several objects of this invention are achieved and which are well adapted to meet the conditions of practical use.

As various possible embodiments might be made of the above described invention, and as various changes might be made in the embodiments set forth, it is to be understood that all matter herein set forth or shown in the accompanying drawing is to be interpreted as illustrative and not in a limiting sense.

Having thus described my invention, I claim as new and desire to protect by Letters Patent:

1. In a servo system including an electrically operated device, a current supply circuit for said device, a pair of saturable reactors, each reactor including a power winding for determining the relative phase of the supply currents to said device, and a control winding operative to render one of said power windings operative and the other power winding inoperative, said control windings being connected in a circuit including resistor means for limiting the operating range of electrical values therein, switch means in said supply circuit and relay means in said control circuit for operating said switch means, said relay means being responsive to electrical values in said control circuit other than said range of values, to open said switch means.

2. In a servo system including a reversible motor, a current supply circuit therefor, a control circuit including a variable resistor operable by said motor and a manually operable variable resistor, a pair of saturable reactors including power windings for determining the rotational direction of said motor, series connected control windings in said control circuit and series connected with said resistors and a direct current source, series connected bias windings arranged in bucking relation to said control windings and series connected with a fixed resistance and said direct current source, said power windings being selectively operable in response to current values within an operating range of current values, and switch means operable to open said supply circuit in response to current values in said control circuit less than the lower limit of said operating range of current values.

3. In a servo system as in claim 2 and further including second switch means operable to open said supply circuit in response to current values in said control circuit greater than the upper limit of said operating range of current values.

4. In a servo system including a reversible motor, a loop circuit including a variable resistor operable by said motor and a manually operable variable resistor, a power circuit for said motor, amplifier means in said loop circuit responsive to input signals regulated by said second mentioned resistor for determining the direction of the current in said power circuit, said loop circuit including a fixed resistance and the windings of a pair of relays in series therewith, a pair of switch means in said power circuit respectively operable by said relays, said loop circuit being operative to carry normal operating currents ranging between predetermined minimum and maximum values, one of said relays being operative to open the switch means associated therewith in response to current values in said loop circuit less than said minimum value and the other of said relays being operative to open the switch means associated therewith in response to current values in said loop circuit greater than said maximum value.

5. In a servo system including a reversible motor, a source of current for said motor, a control circuit including a pair of potentiometers, a pair of reactors, each reactor including a power winding in circuit with said motor and current source, a control winding and a bias winding, said control winding being series connected in said control circuit, a pair of fixed resistances serially connected with a direct current source and connected in said control circuit, said bias windings being arranged in bucking relation to said control windings and series connected with a third fixed resistance and said direct current source, said third resistance having a value equal to one half the sum of the resistance values of said potentiometers plus the sum of the value of said pair of resistances, a pair of relays series connected in said control circuit, said power windings being selectively responsive to a range of current values in said control circuit for supplying current to operate said motor in a given direction, a pair of series connected, normally closed switches in circuit with said motor and said current source and respectively operable by said relays, one of said relays being operative in response to current values in said control circuit less than said range of values and the other of said relays being operative in response to current values in said control circuit greater than said range of values.

6. A control system for a motor comprising a pair of saturable reactors, each reactor including a power winding for regulating the current supplied to said motor, a control winding and a bias winding, said control windings and bias windings being respectively connected and arranged in bucking relation, a loop sensing circuit including said control windings, a direct current source and resistance means for limiting the operating range of electrical values in said sensing circuit, a bias circuit including said bias windings, said direct current source and a fixed resistance, and means in said sensing circuit responsive to electrical values in said sensing circuit other than said operating range of electrical values for rendering said power windings inoperative.

References Cited in the file of this patent

UNITED STATES PATENTS

| | | |
|---|---|---|
| 2,355,568 | Sparrow | Aug. 8, 1944 |
| 2,414,936 | Edwards et al. | Jan. 28, 1947 |
| 2,450,084 | Emerson | Sept. 28, 1948 |
| 2,470,820 | Hull | May 24, 1949 |
| 2,480,574 | Hanna et al. | Aug. 30, 1949 |
| 2,508,162 | Herwald | May 16, 1950 |
| 2,518,865 | Cartotto | Aug. 15, 1950 |
| 2,559,513 | Palmer | July 3, 1951 |
| 2,563,179 | Malsbary | Aug. 7, 1951 |
| 2,628,333 | Maltby | Feb. 10, 1953 |
| 2,634,391 | Rusler | Apr. 7, 1953 |
| 2,673,314 | MacCallum | Mar. 23, 1954 |